United States Patent Office 2,797,241
Patented June 25, 1957

2,797,241

DIETHYL-GLYCINEXYLIDIDE AND PROCESS

Charles Leslie Meredith Brown, Ewell, and Arthur Poole, Goodmayes, England

No Drawing. Application June 22, 1954,
Serial No. 438,591

Claims priority, application Great Britain August 28, 1953

8 Claims. (Cl. 260—562)

This invention relates to a new local anaesthetic substance and process of preparing same.

During recent years, the substance known as lignocaine, which is α-diethylamino-acetyl-xylidide 2.6 and has the formula

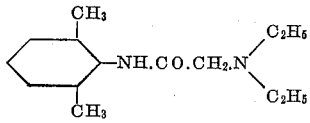

has been found to be very effective as a local anaesthetic.

It has been customary, when the lignocaine has been required for use, for the free base to be dissolved in a calculated quantity of hydrochloric acid to produce an aqueous solution of lignocaine hydrochloride. For example the 1953 edition of "New and Non-official Remedies," points out that "lidocaine hydrochloride is prepared in solution by the action of hydrochloric acid with lidocaine. It is not isolated from the solution. The term "lidocaine hydrochloride" is understood in pharmaceutical circles to be the same compound as "lignocaine hydrochloride," and this latter term is generally used in Europe where the compound was originally discovered. The concentration and pH value of this solution have usually had to be carefully adjusted and it would be a distinct advantage therefore, if the lignocaine hydrochloride could be made available in a solid form which the anaesthetist could prepare for use by simple dissolution in water.

Attempts made in this direction however have not been encouraging, as the solid lignocaine hydrochloride prepared up to the present time takes the form either of an intractable, lumpy mass of doubtful composition, or of a precipitate which is so hygroscopic that it must be packed in air-tight containers for storage and transport.

It has now been found, somewhat surprisingly in view of what is stated above, that lignocaine hydrochloride monohydrate, the preparation of which has not previously been effected, is a stable, non-hygroscopic substance which can be obtained in the form of discreet particles.

According to the invention, a local anaesthetic comprises, as a new substance, lignocaine hydrochloride monohydrate having the formula

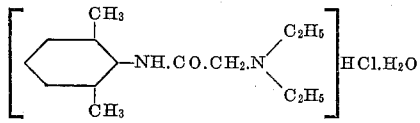

Samples of this substance have been made having a melting point within the range of 77° C. to 80° C.

The lignocaine hydrochloride monohydrate can be readily dissolved in water and retains all the excellent anaesthetic properties of lignocaine base dissolved in hydrochloric acid.

The new substance can be prepared in a number of ways. In one process the monohydrate is caused to separate out in solid form from a solution of the hydrochloride in a solvent medium comprising a limited proportion of water at least sufficient to form the monohydrate, and in the presence of a water-miscible organic liquid in which the monohydrate in insoluble or sparingly soluble.

This process is advantageously carried out by adding an aqueous solution of the hydrochloride of suitable concentration to the water-miscible organic liquid under such conditions as to cause the precipitation of the monohydrate. An alternative method of causing the monohydrate to separate out from solution in the presence of the water-miscible organic liquid is to cause the monohydrate to crystallise from a solution of the hydrochloride in a solvent medium consisting of a mixture of water with the water-miscible liquid. Crystallisation may be brought about by, for example, cooling a solution of the hydrochloride in the solvent mixture. Both of these methods depend on the presence of an adequate proportion of the water-miscible liquid in relation to water to cause the monohydrate to separate out of solution.

Examples of suitable water-miscible organic liquid in which the monohydrate is insoluble or sparingly soluble are acetone, methyl ethyl ketone or dioxane.

It is to be understood that "a limited proportion of water" includes as the lower limit the proportion required to form the monohydrate, and as the upper limit a proportion of water in relation to the proportion of hydrochloride not exceeding that beyond which an undesirably large percentage of the hydrochloride remains in solution. The upper limit is, therefore, largely dependent on economic considerations. In order to obtain a satisfactory yield of the solid monohydrate, it will generally be of advantage to not greatly exceed the quantity of water theoretically required to form the monohydrate. Thus, for example, in precipitating the monohydrate from an aqueous solution of the hydrochloride by the addition of acetone, the proportion of water in excess of the theoretical amount may be up to about 5 molecular proportions per molecular proportion of the hydrochloride, or even up to about 20 molecular proportions if the temperature is sufficiently low, say, about 3° C. There is also an optimum proportion of acetone giving a maximum yield of precipitate, above and below which the yield is lower.

An aqueous solution of the hydrochloride, from which the monohydrate is to be precipitated as described above, may conveniently be prepared by taking up the free base in water with the aid of hydrochloric acid, and it is of advantage to use a proportion of the acid slightly less than that required to convert the whole of the base into the hydrochloride. If the solution so obtained contains an excess of water (i. e. a quantity of water in excess of that required to form the monohydrate) greater than that desired, the excess may be decreased by removing water from the solution by evaporation or by azeotropic distillation with a suitable organic liquid, such as benzene.

In order to prepare a solution of the monohydrate in a mixture of water with the water-miscible organic liquid, from which solution the monohydrate is to be crystallised as described above, gaseous hydrogen chloride may be passed into a mixture of the free base with the water and water-miscible liquid so as to take up the base into solution as the hydrochloride.

In the methods mentioned above, it is desirable for economic reasons to recover the dissolved base and the water-miscible solvent from the mother liquors of precipitation or crystallisation of the hydrochloride monohydrate. This may be done by removal of the solvent, for example acetone, by a process of distillation followed by recovery of the lignocaine from the residual hydrochloride syrup. This may be carried out by treatment with ammonium hydroxide solution. Alternatively the residue may be used in a further operation for the production of the hydrochloride hydrate.

The following specific processes for the production of lignocaine hydrochloride monohydrate are given by way of example.

Example 1

138 grams of lignocaine (melting at 67–68° C.) were dissolved in 54 cc. of concentrated hydrochloric acid of about 33 percent strength by weight, and 660 cc. of acetone were added. The mixture was stirred at 25–30° C. for 1½ hours in order to complete the precipitation of lignocaine hydrochloride monohydrate, which separated out in a granular crystalline form. The monohydrate was then filtered off. There were obtained 110 grams of the monohydrate melting at 77–78° C.

The mother liquor was worked up to recover acetone and lignocaine.

Example 2

A solution of 20 grams of lignocaine in the quantity of 2 N-hydrochloric acid necessary to form the hydrochloride was dehydrated by subjecting the solution to azeotropic distillation with benzene until no more water passed over. The resulting lignocaine hydrochloride was dissolved at about 60° C. in a mixture of 70 cc. of methyl ethyl ketone and 1.2 cc. of water. The latter quantity of water together with the small amount already present in the hydrochloride amounted to slightly more than one molecular proportion per molecular proportion of the hydrochloride (calculated as anhydrous). The hot solution was allowed to cool to room temperature overnight, and the crystalline monohydrate so formed was filtered off. There were obtained 22.5 grams of lignocaine hydrochloride monohydrate melting at 77–78° C.

The mother liquor was worked up to recover methyl ethyl ketone and lignocaine.

We claim:

1. α-Diethylamino - 2,6 - acetyl-xylidide hydrochloride monohydrate in the form of non-hygroscopic, discrete, solid particles having a melting point in the range 77–80° C. and conforming to the formula:

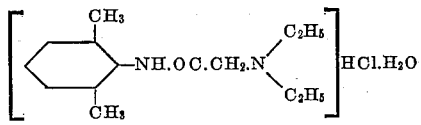

2. A process for preparing α-diethylamino-2,6-acetyl-xylidide hydrochloride monohydrate in the form of non-hygroscopic, discrete, solid particles, comprising dissolving α-diethylamino-2,6-acetyl-xylidide hydrochloride in a solvent medium therefor comprising a limited quantity of water sufficient to form said monohydrate, and causing said monohydrate to separate from said medium as discrete solid particles.

3. A process for preparing α-diethylamino-2,6-acetyl-xylidide hydrochloride monohydrate in the form of non-hygroscopic, discrete, solid particles, which comprises dissolving α-diethylamino-2,6-acetyl-xylidide hydrochloride in a solvent medium therefor comprising a limited quantity of water sufficient to form said monohydrate, and precipitating said monohydrate from said medium as discrete solid particles by incorporating in said medium, in sufficient proportion to induce said precipitation, a water-miscible organic liquid in which said monohydrate is at most only sparingly soluble.

4. A process for preparing α-diethylamino-2,6-acetyl-xylidide hydrochloride monohydrate in the form of non-hygroscopic, discrete, solid particles, comprising mixing an aqueous solution of α-diethylamino-2,6-acetyl-xylidide hydrochloride with a water-miscible organic liquid in which the monohydrate is at most sparingly soluble, said liquid being provided in sufficient proportion to induce precipitation of the monohydrate and causing the monohydrate to separate out in the form of discrete, solid particles.

5. A process as claimed in claim 4 wherein said organic liquid is selected from the group consisting of acetone, methyl ethyl ketone and dioxane.

6. A process for preparing α-diethylamino-2,6-acetyl-xylidide hydrochloride monohydrate which comprises forming a solution of α-diethylamino-2,6-acetyl-xylidide hydrochloride in a solvent medium comprising a limited quantity of water sufficient to form said monohydrate and a water-miscible organic liquid in which said monohydrate is at most only sparingly soluble, and causing said monohydrate to crystallize from said solution.

7. A process as claimed in claim 6 wherein said monohydrate is crystallized by cooling said solution.

8. A process as claimed in claim 6 wherein said organic liquid is selected from the group consisting of acetone, methyl ethyl ketone and dioxane.

References Cited in the file of this patent

UNITED STATES PATENTS

| | | |
|---|---|---|
| 2,441,498 | Lofgren et al. | May 11, 1948 |

FOREIGN PATENTS

| | | |
|---|---|---|
| 509,516 | Belgium | Mar. 15, 1952 |

OTHER REFERENCES

Lofgren: "Arkiv For Kemi, Mineralogi Och Geologi," vol. 22A, No. 18 (1946), pp. 3 and 10.